(12) United States Patent
Bedekar et al.

(10) Patent No.: US 12,399,739 B2
(45) Date of Patent: Aug. 26, 2025

(54) HARDWARE ACCELERATION FOR FREQUENCY DOMAIN SCHEDULER IN WIRELESS NETWORKS

(71) Applicant: Nokia Solutions and Networks Oy, Espoo (FI)

(72) Inventors: Anand Bedekar, Gleenview, IL (US); Rajeev Agrawal, Gleenview, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 900 days.

(21) Appl. No.: 16/961,722

(22) PCT Filed: Jan. 11, 2018

(86) PCT No.: PCT/US2018/013280
§ 371 (c)(1),
(2) Date: Jul. 13, 2020

(87) PCT Pub. No.: WO2019/139588
PCT Pub. Date: Jul. 18, 2019

(65) Prior Publication Data
US 2021/0064423 A1    Mar. 4, 2021

(51) Int. Cl.
*G06F 9/48* (2006.01)
*G06F 9/50* (2006.01)
(Continued)

(52) U.S. Cl.
CPC .......... *G06F 9/4881* (2013.01); *G06F 9/5016* (2013.01); *G06F 12/0646* (2013.01);
(Continued)

(58) Field of Classification Search
CPC .. G06F 9/4881; G06F 9/5016; G06F 12/0646; G06F 2212/1008; H04W 28/0278; H04W 72/0453; G06Q 10/06312
See application file for complete search history.

(56) References Cited

U.S. PATENT DOCUMENTS 6,065,135 A * 5/2000 Marshall ............. G06F 11/1044
714/E11.061
9,425,944 B1 * 8/2016 Singh ................ H04W 52/0277
(Continued)

FOREIGN PATENT DOCUMENTS

| CN | 101390397 A | 3/2009 | |
|---|---|---|---|
| CN | 101527673 A | 9/2009 | |
| EP | 2582192 A1 * | 4/2013 | .......... H04W 72/048 |

*Primary Examiner* — Aimee Li
*Assistant Examiner* — Willy W Huaracha
(74) *Attorney, Agent, or Firm* — Joseph C. Drish; McCarter & English, LLP (57) ABSTRACT

Methods and apparatuses are provided for hardware acceleration for a frequency domain scheduler. An example method includes receiving an instruction from a processor core to process a job for determining an allocation of a set of resources to one or more users, the set of resources corresponding to a transmission layer in a transmission time interval; processing the job by determining which of the one or more users is to be allocated on each of the respective resources in the set based on a first array stored in a memory associated with a metric of each of one or more users for each of the resources in the set, and a second array stored in the memory associated with a buffer size of each of the one or more users; and in response to successfully completing the job, sending an indication of the determined allocation to the processor core.

23 Claims, 5 Drawing Sheets

(51) Int. Cl.
    *G06F 12/06*      (2006.01)
    *G06Q 10/0631*    (2023.01)
    *H04W 28/02*      (2009.01)
    *H04W 72/0453*    (2023.01)

(52) U.S. Cl.
    CPC ... *H04W 28/0278* (2013.01); *H04W 72/0453* (2013.01); *G06F 2212/1008* (2013.01); *G06Q 10/06312* (2013.01)

(56) References Cited

U.S. PATENT DOCUMENTS

| | | | |
|---|---|---|---|
| 10,660,093 B2* | 5/2020 | Schellmann | H04L 5/0064 |
| 2007/0067511 A1* | 3/2007 | Khawand | G06F 9/5016 |
| | | | 710/52 |
| 2012/0167062 A1 | 6/2012 | Levanoni et al. | |
| 2014/0204849 A1* | 7/2014 | Chen | H04L 5/0053 |
| | | | 370/329 |
| 2015/0319772 A1* | 11/2015 | Halabian | H04W 72/535 |
| | | | 370/329 |
| 2016/0306667 A1 | 10/2016 | Burger et al. | |
| 2017/0185403 A1* | 6/2017 | Anderson | G06F 12/0875 |
| 2017/0214441 A1* | 7/2017 | Wang | H04J 11/003 |
| 2017/0230964 A1* | 8/2017 | Park | H04W 72/21 |
| 2017/0351547 A1* | 12/2017 | Burger | H04L 67/10 |
| 2019/0123848 A1* | 4/2019 | Feng | H04L 5/0053 |
| 2019/0132822 A1* | 5/2019 | Kim | H04B 7/0452 |
| 2019/0207657 A1* | 7/2019 | Cao | H04B 7/0602 |
| 2019/0386716 A1* | 12/2019 | Uchida | H04B 7/0617 |

* cited by examiner

FIG. 5 ance for wireless networks and, more specifically, relates to hardware acceleration for a frequency domain scheduler for wireless networks.

HARDWARE ACCELERATION FOR FREQUENCY DOMAIN SCHEDULER IN WIRELESS NETWORKS

CROSS REFERENCE TO RELATED APPLICATION

This patent application is a U.S. National Stage application of International Patent Application Number PCT/US2018/013280 filed Jan. 11, 2018, which is hereby incorporated by reference in its entirety.

TECHNICAL FIELD

This invention relates generally to wireless networks and, more specifically, relates to hardware acceleration for a frequency domain scheduler for wireless networks.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, after the main part of the detailed description section.

In wireless networks, a Scheduler (also referred to as a MAC Packet Scheduler or MAC Scheduler) is typically run as a software process (or multiple threads) on central processing unit (CPU) or digital signal processing (DSP) or system-on-chip (SOC) cores. We may refer to these generically as CPU cores, processor cores, or just 'cores'. The Scheduler performs many compute intensive tasks, including multiple invocations of sort for a large number of user/flow metrics. This problem is further exacerbated in 5G wireless network, as compared to LTE wireless networks, by various factors, including: larger bandwidths resulting in more resources for the Scheduler to allocate; massive MIMO implementations which require allocation of more simultaneous beams and higher complexity of algorithms to jointly select across multiple beams; and smaller TTI durations resulting in shorter deadline to complete the allocation work.

BRIEF SUMMARY

This section is intended to include examples and is not intended to be limiting.

According to an example of an embodiment, a method is provided including receiving an instruction from a first processor core to process a first job for determining an allocation of a set of resources to one or more users, the set of resources corresponding to a first transmission layer in a transmission time interval; processing the first job by determining which of the one or more users is to be allocated on each of the respective resources in the set based on a first array stored in a memory associated with a metric of each of one or more users for each of the resources in the set, and a second array stored in the memory associated with a buffer size of each of the one or more users; and in response to successfully completing the first job, sending an indication of the determined allocation of the set of resources to the first processor core.

An additional example of an embodiment includes a computer program, comprising code for causing the method of the previous paragraph to be performed, when the computer program is run on a processor. The computer program according to this paragraph, wherein the computer program is a computer program product comprising a computer-readable medium bearing computer program code embodied therein for use with a computer.

According to another example embodiment, an apparatus is provided including: means for receiving an instruction from a first processor core to process a first job for determining an allocation of a set of resources to one or more users, the set of resources corresponding to a first transmission layer in a transmission time interval; means for processing the first job by determining which of the one or more users is to be allocated on each of the respective resources in the set based on a first array stored in a memory associated with a metric of each of one or more users for each of the resources in the set, and a second array stored in the memory associated with a buffer size of each of the one or more users; and in response to successful completion of the first job, means for sending an indication of the determined allocation of the set of resources to the first processor core.

According to another example embodiment, an apparatus is provided including: a hardware accelerator; at least one processor comprising one or more processing cores; at least one non-transitory memory including computer program code, the at least one memory and the computer program code configured to, with the at least one processor and the hardware accelerator, cause the apparatus at least to: receive an instruction at the hardware accelerator from a first processor core of the at least one processor to process a first job for determining an allocation of a set of resources to one or more users, the set of resources corresponding to a first transmission layer in a transmission time interval; process, by the hardware accelerator, the first job by determining which of the one or more users is to be allocated on each of the respective resources in the set based on a first array stored in a memory associated with a metric of each of one or more users for each of the resources in the set, and a second array stored in the memory associated with a buffer size of each of the one or more users; and in response to successfully completion of the first job, send an indication of the determined allocation of the set of resources to the first processor core.

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for hardware acceleration for a frequency domain scheduler. Additional description of these techniques is presented after a system into which the exemplary embodiments may be used is described.

Features as described herein occasionally refer to LTE terms, however, it should be noted that these features may be used in the future with other types of systems. For example, references to an eNB (i.e. an LTE base station) are equally applicable to future base stations of wireless networks (such as, for example, base stations in 5G wireless networks referred to as gNB) unless indicated otherwise.

Figure 1:
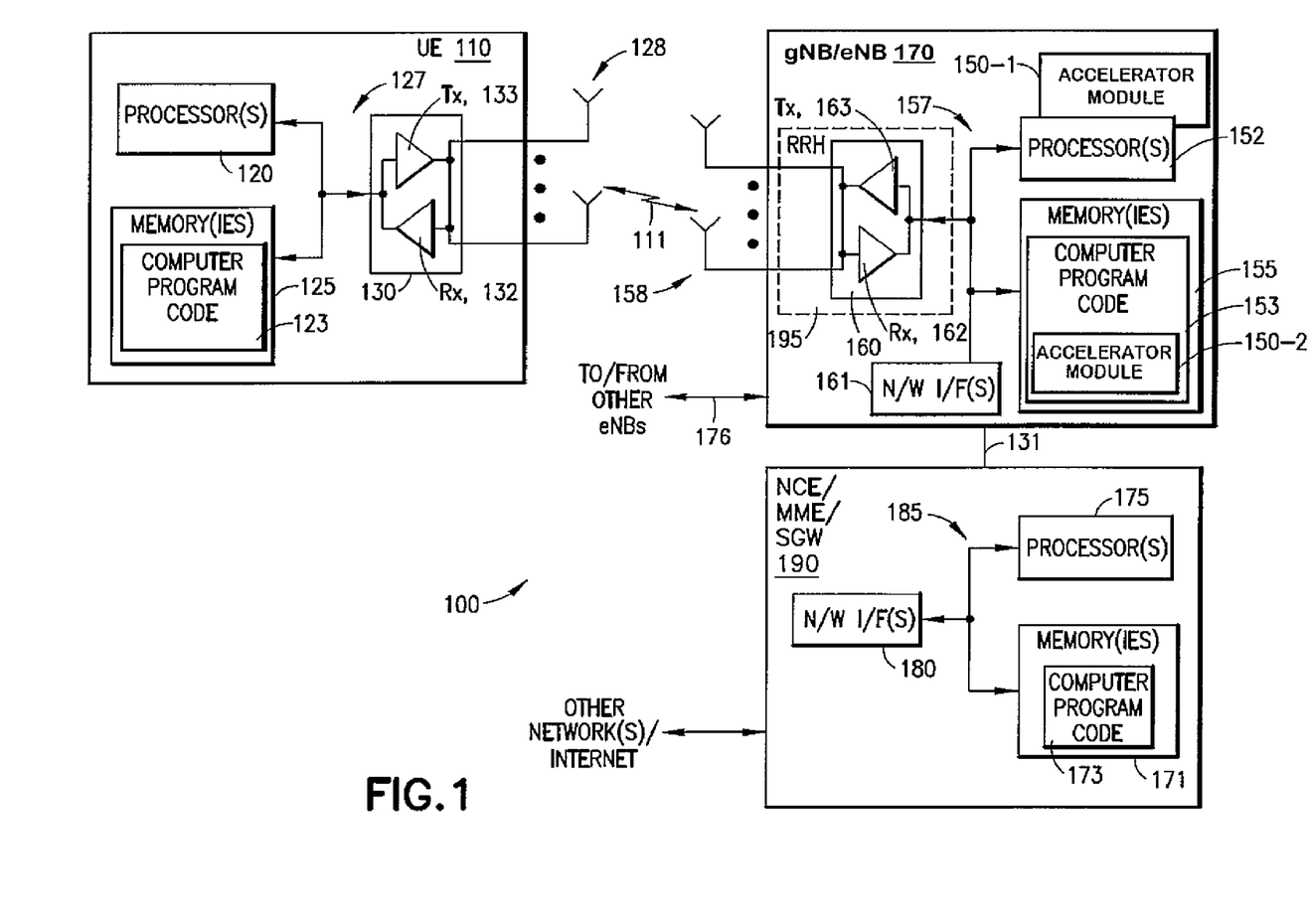
FIG. 1 is a block diagram of one possible and non-limiting exemplary system in which the exemplary embodiments may be practiced.

Turning to FIG. 1, this figure shows a block diagram of one possible and non-limiting exemplary system in which the exemplary embodiments may be practiced. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. For instance, the one or more memories 125 and the computer program code 123 may be configured to, with the one or more processors 120, cause the user equipment 110 to perform one or more of the operations as described herein. The UE 110 communicates with gNB 170 via a wireless link 111.

The gNB/eNB (5$^{th}$ Generation Node B/evolved Node B) 170 is a base station (for example, for 5G wireless networks and/or LTE wireless networks) that provides access by wireless devices such as the UE 110 to the wireless network 100. The gNB 170 includes one or more processors 152 (which may comprise for example various types of processor cores such as CPU or DSP or SOC cores), one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The gNB 170 includes an accelerator module, comprising one of or both parts 150-1 and/or 150-2, which may be implemented in a number of ways. The accelerator module may be implemented in hardware as accelerator module 150-1, such as being implemented as part of the one or more processors 152. The accelerator module 150-1 may be implemented also as an integrated circuit or through other hardware such as a programmable gate array which may be external to the processors 152, or adjunct to the processors 152 as a co-processor, or even as specialized circuitry internal to the same chip as the processors 152, or in any other suitable manner. In another example, the accelerator module may be implemented as accelerator module 150-2, which is implemented as computer program code 153 and is executed by the one or more processors 152 (e.g. on one or more specialized cores within the processors 152 which may be capable of executing certain specialized instructions). For example, the one or more memories 155 and the computer program code 153 are configured to, with the one or more processors 152, cause the gNB 170 to perform one or more of the operations as described herein. The one or more network interfaces 161 communicate over a network such as via the links 176 and 131. Two or more gNBs 170 communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the gNB 170 being physically in a different location from the RRH, and the one or more buses 157 could be implemented in part as fiber optic cable to connect the other elements of the gNB 170 to the RRH 195.

It is noted that description herein indicates that "cells" perform functions, but it should be clear that the gNB that forms the cell will perform the functions. The cell makes up part of an gNB. That is, there can be multiple cells per gNB. The term "cell" may refer to the coverage area of a given set of transceivers associated with a gNB, or may refer to the logical part of the gNB that performs functions related to the transmission/reception within that coverage area. For instance, there could be three cells for a single gNB carrier frequency and associated bandwidth, each cell covering one-third of a 360 degree area so that the single gNB's coverage area covers an approximate oval or circle. Furthermore, each cell can correspond to a single carrier and an gNB may use multiple carriers. So if there are three 120 degree cells per carrier and two carriers, then the gNB has a total of 6 cells.

The wireless network 100 may include one or more network control elements (NCE) 190 that may include MME (Mobility Management Entity) and/or SGW (Serving Gateway) functionality, and which provides connectivity with a further network, such as a telephone network and/or a data communications network (e.g., the Internet). The gNB 170 is coupled via a link 131 to the NCE 190. The link 131 may be implemented as, e.g., an 51 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, gNB 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions. A user device may conduct one or more traffic flows simultaneously, for example corresponding to different applications and having different needs for throughput or latency or other key performance-determining indicators.

Having thus introduced one suitable but non-limiting technical context for the practice of the exemplary embodiments of this invention, the exemplary embodiments will now be described with greater specificity.

It is noted that the terms 'flow' and 'user' may be used interchangeably for the purposes of the description below, unless indicated otherwise.

As noted above, the Scheduler in wireless networks performs many computer intensive tasks, including multiple invocations of sort for a large number of user/flow metrics. Within the gNB, a Scheduler instance is typically associated with a cell or a carrier, and typically performs the task of allocating radio resources among the users or flows that are connected to that cell. The radio resources may comprise time-domain resources, such as transmission-time intervals for example; or frequency-domain resources, sometimes known as physical resource blocks (PRBs) or resource block groups (RBGs). The Scheduler typically performs the task of determining the allocation or division of radio resources between one or more users, or between one or more traffic flows of one or more users. The determination of which users (or flows) are eligible for being allocated resources within a given transmission time interval (TTI) (sometimes known as time-domain scheduling or TD-scheduling) may be based on various metrics and channel properties of the users or flows, such as a proportionally fair metric as well as spectral efficiencies of the users' channels.

The determination of the allocation of specific frequency-domain resources to the different users/flows (sometimes known as frequency-domain scheduling or FD-scheduling), may be based on various metrics and channel properties of the users/flows which may differ from one radio resource to another. For example, wireless channels are often frequency-selective, that is, the channel gain or spectral efficiency of a user on a given frequency-domain radio resource may be different from that on a different frequency-domain radio resource, and hence the FD-scheduling allocation of frequency-domain resources may take into account such frequency-selective differences of the different user/flows across different frequency-domain resources. This is sometimes termed as frequency-selective scheduling (FSS).

Further, in Multiple-Input Multiple-Output (MIMO, also sometimes known as massive MIMO) systems which employ multiple transmit/receive antennas, the scheduler may allocate a given time-domain or frequency-domain resource to multiple users (or flows belonging to different users) simultaneously. This is typically achieved in MIMO systems by forming different beams towards different users (for example by using different sets of antenna weights on the multiple antennas) by using a technique known as spatial-division multiplexing which allows different transmit beams to be formed towards different users in a manner that reduces the overlap between the beams. Thus, reducing the interference experienced by one user (receiving one beam) from another beam simultaneously transmitted to a different user.

Massive MIMO systems can sometimes transmit multiple transmission layers or spatial dimensions. Each MIMO layer may comprise, for example, a single beam (for example, the same beam transmitted on all frequency domain resources, with different users/flows allocated different frequency domain resources as described above), or may comprise multiple beams (for example, different beams generated on frequency domain resources). There may be multiple transmission layers transmitted simultaneously in a given transmission time interval in a cell. The Scheduler in a massive MIMO system typically determines the selection of beams and the selection of users for which specific beams should be used for transmission, as well as the mapping of beams to transmission layers. This selection of beams and layers is sometimes known as spatial-domain scheduling (SD-scheduling), and may be combined with TD or FD scheduling as described above. These aspects of a wireless system and Scheduler may apply to both LTE as well as 5G systems as well as other systems, which may use either lower frequency bands (below 6 GHz or sub-6 GHz) or higher frequency bands (centimeter-wave or millimeter-wave, typically above 6 GHz).

Figure 2:
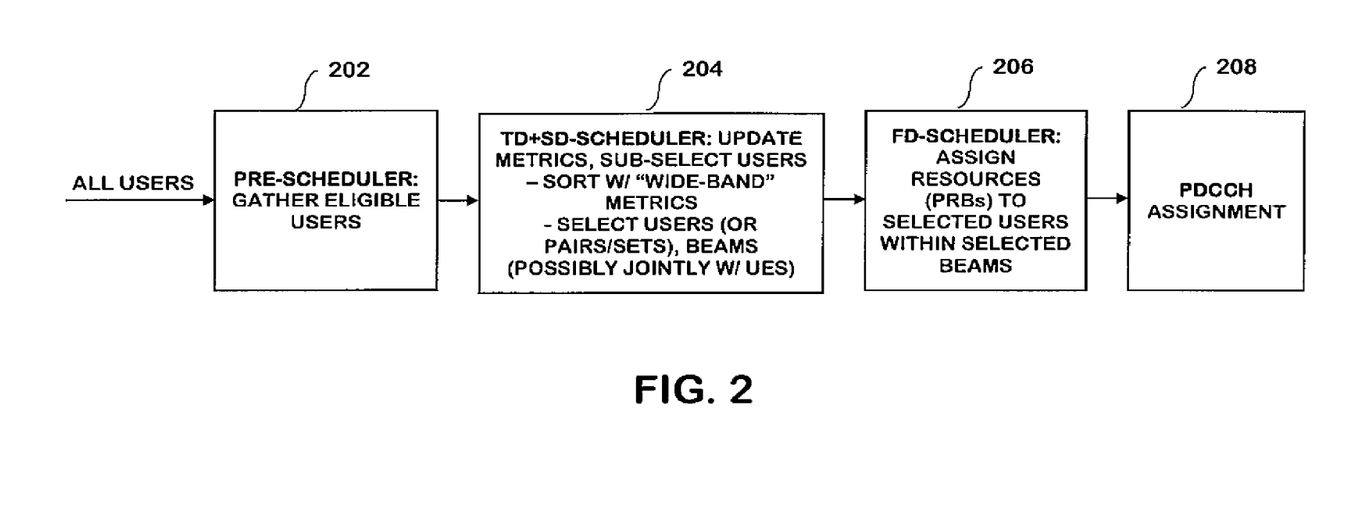
FIG. 2 is a simplified process flow diagram of a Scheduler in accordance with exemplary embodiments.

Referring now to FIG. 2, this figure shows a simplified process flow diagram of a scheduler of a wireless network (such as LTE and 5G wireless networks, for example) in accordance with an example embodiment. In particular, the process flow diagram of the scheduler includes pre-scheduler component 202; a time-domain and spatial-domain (TD+SD) component 204; a frequency domain (FD) component 206; and a PDCCH component 208. At the pre-scheduler component 202 all eligible users are determined and the eligible users are passed to the TD+SD scheduling component 204. In each TTI, the TD+SD scheduling component 204 selects a subset of users/flows (and possibly subset of beams in case of massive MIMO), and passes this information to the FD scheduler 206 for frequency-domain resource allocation for that TTI. In 5G with massive MIMO, multiple spatial dimensions (e.g. beams) may be transmitted simultaneously and so the FD scheduler 206 has to perform the FD allocation for multiple beams or layers in each TTI. As described above, FD Scheduling on a given beam is executed as frequency-selective scheduling. This is also expected to be the case the case in sub-6 GHz 5G wireless networks. This is a computationally complex operation which requires repeatedly finding for example the maximum of certain metric quantities $M(i,j)$ for each resource (e.g. RBG) j over a given set of flows i.

One issue with these computations is that the max over each resource j cannot be found in parallel due to the finite size of the buffer. Typically, resources need to be sequentially allocated one resource at a time and then the allocated buffer is decremented. Otherwise one may end up with a situation where multiple resources are allocated to the same user/flow, but the flow does not have enough data in the buffer to make use of all the resources, leading to significant inefficiency. Further, this operation has to be performed for multiple beams. Example embodiments utilize hardware acceleration blocks to speed up the execution time of the FD scheduler 206 for 5G with massive MIMO. It is also noted that the same problem also applies to massive MIMO in LTE, although the bandwidth in question may be smaller in LTE than 5G.

An example of the algorithm used by an FD-Scheduler is now discussed in more detail. In each TTI, the FD-scheduler is provided (by the TD scheduler) a set of candidate flows, a set of beams (or spatial layers), and a set of frequency domain resources, and the FD-scheduler has to allocate the resources to the flows over the different beams.

The following notation is used in the description below. For the scheduler algorithm, there are F flows and R frequency-domain resources (e.g. RBGs), where flow i has amount of data $B(i)$ in its buffer. Each flow i (which may correspond to a user or bearer) has a Scheduling weight $W(i)$. On each transmission layer k, on each frequency resource j, a user/flow i can be transmitted an amount of data $S(i,j,k)$. The scheduling metric of the flow i on resource j on transmission layer k is sometimes constructed as $M(i,j,k) = W(i)*S(i,j,k)$. For example, the scheduling weight for the PF (proportionally fair) scheduler may be $W(i)=1/(R\_ave(i))$, reciprocal of the average throughput obtained by user i, or alternatively could be a GBR/delay-related metric. $S(i,j,k)$ may be a measure of the spectral efficiency of user i on frequency resource/ on transmission layer k. A user may have different spectral efficiency on each frequency resource j due to the frequency selectivity of the channel, as noted earlier. The user's scheduling metric is product of scheduling weight $W(i)$ and spectral efficiency $S(i,j,k)$. For simplicity, whenever we are working on a transmission layer beam id k, the index k may be suppressed in the notation. For example, $S(i,j,k)$ may be referenced as $S(i,j)$ and $M(i,j,k)$ may be referenced as $M(i,j)$. $C(i)$ represents the number of control channel elements (CCEs) required to send a control indication to user i to convey the resource allocation, and $C_{total}$ represents the total number of available CCEs.

FD Scheduling Algorithm: An exemplary FD scheduling algorithm would iteratively execute the following:

Take one of the chosen transmission layers and perform the FD scheduling for that transmission layer.

For each remaining resource j, find the flow $F^*(j)$ which has the max metric on resource j among all flows i eligible for resource j with non-zero amount of data remaining in the buffer (i.e. $B(i)>0$), namely, $F^*(j) = \text{argmax}_i M(i,j)$.

Among all remaining resources j, find $j^* = \text{argmax}_j M(F^*(j),j))$. Assign resource $j^*$ to flow $F^*(j^*)$ Decrement the amount of data remaining in the buffer of flow $F^*(j^*)$ by the amount of data that can be delivered or flow $F^*(j^*)$ on resource $j^*$::$B(F^*(j^*)) = \max(0, B(F^*(j^*)) - S(F^*(j^*),j^*))$ Optionally, count a certain number of CCEs $C(F^*(j^*))$ for PDCCH as assigned for this user, and decrement a total count of remaining CCEs, i.e. $C_{total} = C_{total} - C(F^*(j^*))$ Mark resource $j^*$ as assigned, and flow $F^*(j^*)$ as ineligible for further allocation in this TTI if its remaining data in the buffer is 0 i.e. if $B(F^*(j^*))=0$ Repeat Iteration until either all data of all flows is assigned, or until all CCEs are exhausted, or there are no more resources on this transmission layer Repeat the above process for each transmission layer.

As those skilled in the art will appreciate, certain details in the FD Scheduling algorithm above have been omitted for simplicity, such as accounting for new transmissions versus retransmissions for example. Further, substantially any algorithm may be used for the FD scheduling, with the above being but one possible algorithm. It may be noted that these types of FD scheduling algorithms have significant complexity, which increases with the number of users/flows, the number of frequency domain resources, and the number of transmission layers. However, the scheduler has a given amount of time (constrained by the transmission time interval) to execute the task of determining this frequency-domain resource allocation. Thus, it is desirable to find ways to speed up the execution of such FD scheduling algorithms, for example by means of a suitable hardware accelerator.

One issue in implementing the FD-Scheduling algorithm above is that it requires a series of "max" operations with a dependency between them, as opposed to is a single sort, due to which a typical sort accelerator that provides a fast implementation of simple sorting is not enough. For example, in the first iteration, the scheduler has to find the best user on each RBG, then finds the best user among each of these, and then allocates the found RBG to the found user. To calculate this with a typical sort accelerator would require multiple passes to the accelerator, passing one array (metrics of users on a given RBG) at a time to the accelerator, which requires significant overhead since each pass to the accelerator incurs overhead. Further, the second iteration depends on the outcome of the RBG allocation decision in the first iteration. This means the buffer count of the user, and possibly CCEs, need to be decremented as the first RBG has to be eliminated from the list before the second iteration can start. Thus, the FD-scheduling algorithm has a sequential dependency due to which it is not possible to execute the allocation on different frequency resources in parallel.

According to an example embodiment, a hardware (HW) accelerator or co-processor for a Wireless MAC Scheduler is provided. The HW accelerator (also referred to herein as a scheduler accelerator) may correspond to accelerator module block 150-1 and/or 150-2 in FIG. 1 for example. The HW accelerator may receive the following as input:

A first pointer to an array of pointers of specified length (representing number of resources), where each pointer in the array of pointers points to an array of a measure of spectral efficiency of a set of eligible users/flows for a set of resources. This can be represented as a 2D matrix of size (Number of flows)*(Number of resources). For example, the first pointer may be a pointer to a 1-D array of pointers where each pointer in the array points to a 1-D array of elements, where each element represents a measure of spectral efficiency of one user/flow on one resource, namely, S(i,j);

A second pointer to an array of buffer sizes B(i), where the length is equal to number of flows;

Optionally, a third pointer to an array of scheduling weights W(i), where the length is equal to the number of flows;

Optionally, a fourth pointer to an array of CCEs C(i), where the length of the array is equal to a number of flows (or users);

A fifth pointer to an array where the flow-assignment decisions F*(j) will be written (or optionally, a flag indicating that the output should be written in place of an existing array), where length of the array corresponds to a number of resources;

In this example embodiment, the HW accelerator may then performs the following:

Iteratively performs the FD-scheduling algorithm described above, using the provided metrics, buffer sizes, and CCEs;

Writes the output into the location in memory specified by the fourth pointer (including, for example, the decision of which user has been allocated for each resource, the allocated CCEs, remaining buffer sizes, etc), and Return a status value indicating completion or error conditions.

Figure 3:
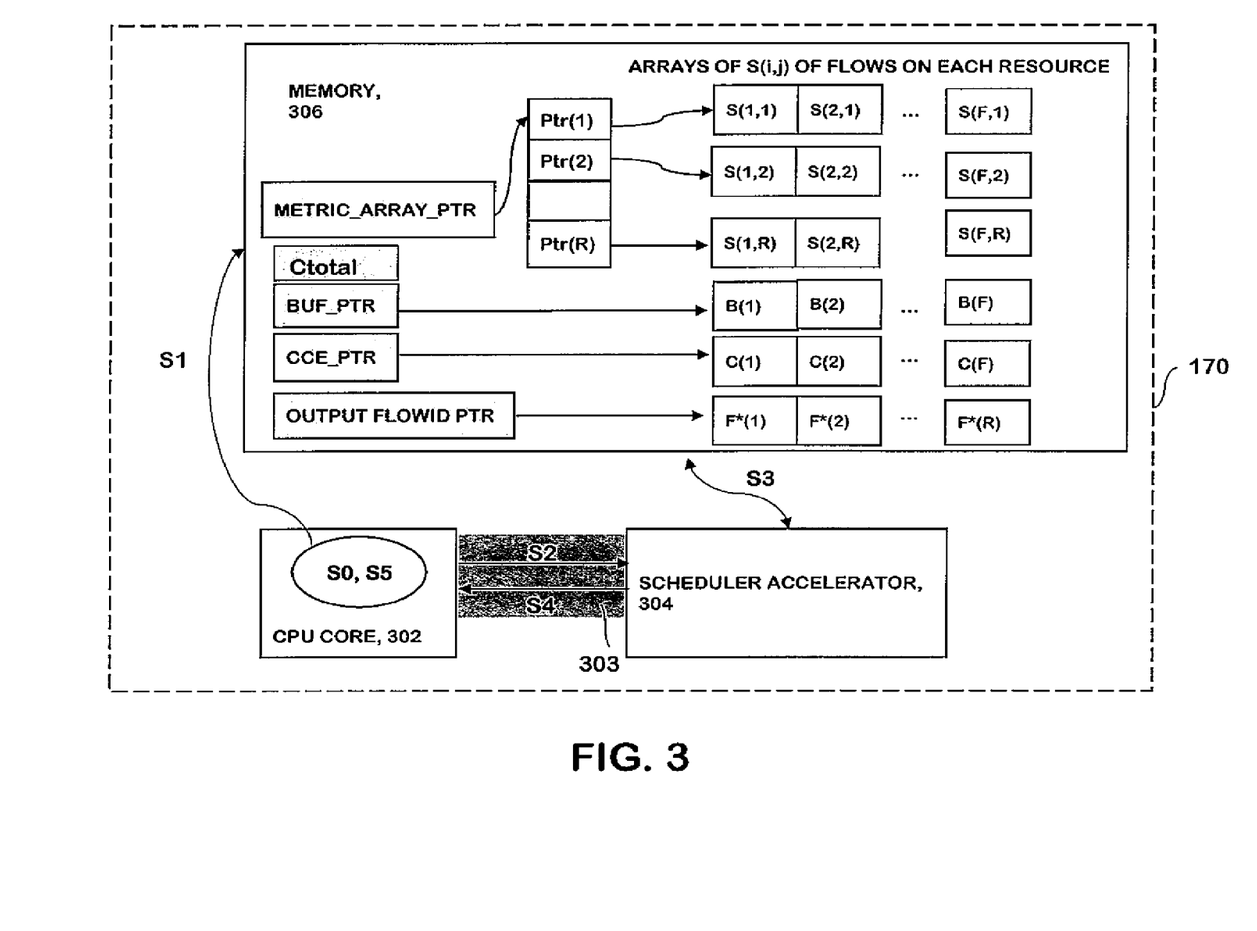
FIG. 3 is a simplified schematic diagram overviewing the use of a scheduler accelerator or a co-processor with a memory and a processor in accordance with an exemplary embodiments.

Referring now to FIG. 3, this figure is a simplified schematic diagram overviewing the use of a scheduler accelerator (or co-processor) with a memory and a processor in accordance with exemplary embodiments. More specifically, FIG. 3 shows the flow between a CPU core 302 that is in charge of executing frequency-domain scheduling, memory 306, and a scheduler accelerator 304. For example, the process flow diagram may be implemented in a base station of a wireless network, such as gNB 170 in FIG. 1 where the CPU core 302 corresponds to the at least one processor 152, the memory 306 corresponds to the at least one memory 155, and the scheduler accelerator 304 corresponds to the accelerator module 150-1 and/or 150-2. At step S0 the CPU core 302 selects a transmission layer k. At step S1, the CPU core prepares:

a block of memory comprising a 2-D array (represented as a pointer of pointers) which is in this example is referred to as metric_array_ptr;

an array of buffer sizes (referred to as Buf_ptr in FIG. 3); and optionally, an array of control channel elements (CCEs) (referred to as CCE_ptr in FIG. 3), as well as a total available number of control channel elements (Ctotal); and a "zeroed-out" or suitably initialized array in which output decisions may be written (referred to as output_flowid_ptr in FIG. 3).

Each pointer in metric_array_ptr points to an array, S(i,j), of per-resource values representing a measure of spectral efficiency of a user/flow. At step S2, the CPU core 302 passes these input parameters to the scheduler accelerator 304. At step S3, the scheduler accelerator 304 processes the input block, and at step S4 the scheduler accelerator provides a notification to the CPU core that the task is complete.

This notification may be provided as an event in an event machine (EM) queue or via another suitable bus as represented by shaded region 303. At step S5, the CPU core 302 selects another transmission layer, and repeats steps S1-S5 for that transmission layer.

Figure 4:
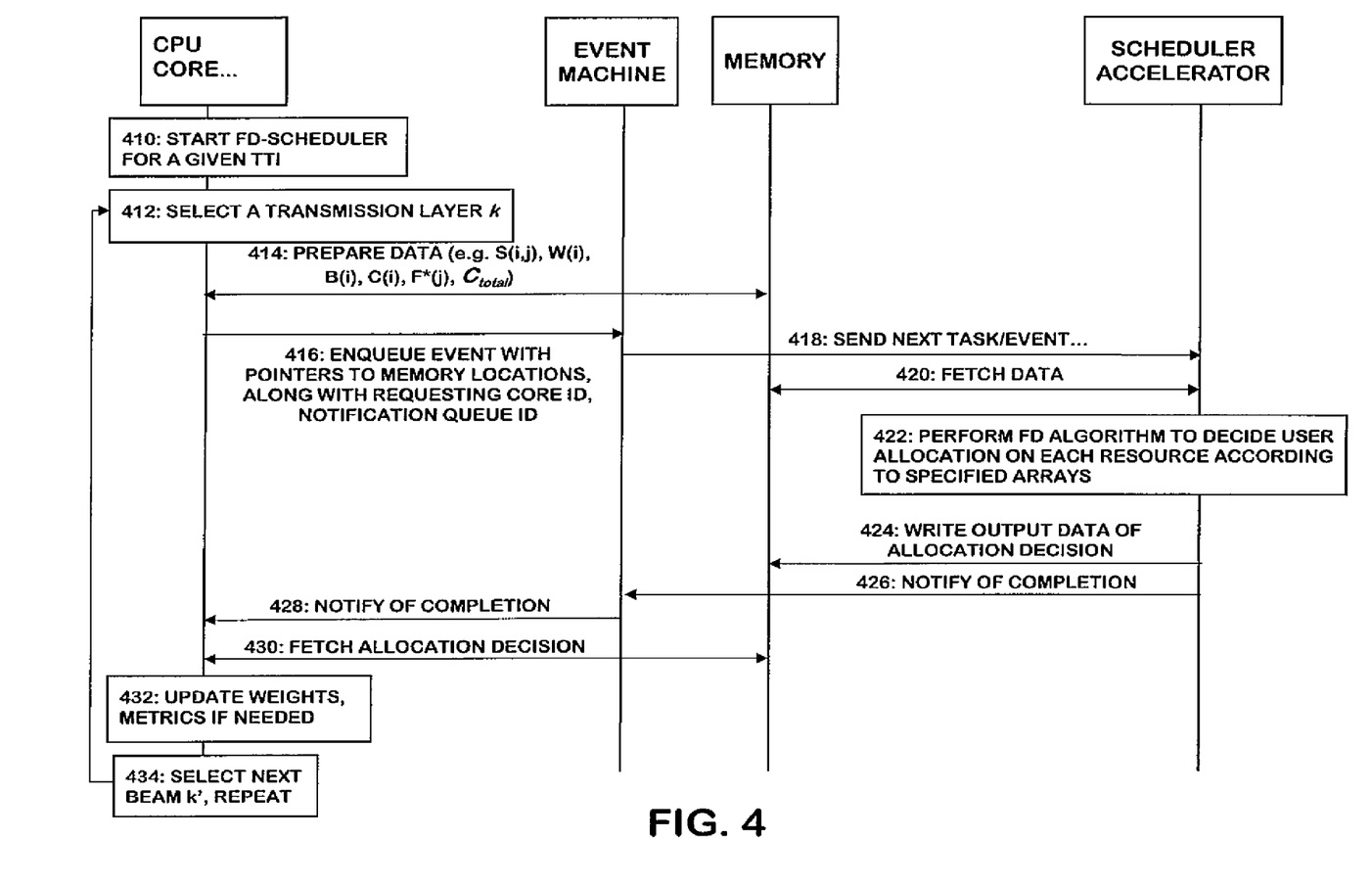
FIG. 4 is a message flow diagram for communication between a CPU core and a scheduler accelerator in accordance with exemplary embodiments.

Referring now to FIG. 4, this figure is a message flow diagram for a CPU core and a scheduler accelerator in accordance with an example embodiment. Event Machine queues and events are used in this example to facilitate the communication between the CPU core and the accelerator. In this example, the CPU core starts the FD-Scheduler for a given transmission time interval as shown at 410, and selects a transmission layer k at 412. The CPU core then prepares 414 data structures in memory for the following: flows for each resource (i.e. S(i,j)); buffer size (i.e. B(i)); optionally, control channel elements (i.e. C(i)); scheduling weights W(i); and output (i.e. F*(j)). At step 414, the CPU core may also indicate the total available number of control channel elements $C_{total}$ in the memory. For example, this may be done by sending one or more signals from the CPU core to allocate the data structures in the memory. The CPU core sends a message 416 to the EM to enqueue a first event containing an indication of the various data structures, such as by sending pointers to the memory location of the data structures. Then, the EM sends an indication of the next pending task/event 418 (which in this example would be the first event) to the scheduler accelerator, and the scheduler accelerator fetches 420 the data corresponding to the task event from the memory. At 422, the scheduler accelerator performs the FD-Scheduler algorithm to decide user allocation on each resource according to the specified inputs. The scheduler accelerator then writes 424 the output data of the allocation decision to the memory (including for example the decision of which user has been allocated for each resource, the allocated CCEs, remaining buffer sizes, etc.), and notifies 426 the EM that the task has been completed (or with an indication of error conditions if appropriate), typically by creating/enqueueing a second event containing pointers to the output and error indications. The EM subsequently notifies 428 the CPU core that the task has been completed by dispatching the second event to the CPU core, and the CPU Core fetches 430 the allocation decision from the memory. At 432, the CPU Core updates weights and metrics such as the scheduling weights W(i) which may be based on a proportionally fair metric, if needed, based on the allocation decisions returned by the accelerator. At 434 the CPU core selects the next transmission layer k' and repeats the process for that transmission layer.

In FIG. 4, an EM is shown for dispatching the tasks from the CPU core to the scheduler accelerator, however, it is also possible that any other suitable method may be used for communication between CPU core and scheduler accelerator besides an EM, such as via any suitable bus for example.

It is also noted that in the above-described example embodiments are described such that the CPU core sends a single task (corresponding to the allocation of resources on a single transmission layer), waits for that task to finish, and then dispatches the next job. For example, assume the FD allocation for one transmission layer corresponds to a single beam. In this situation, the FD allocation for that one beam may be finished before proceeding to the FD-allocation for the next beam. This is useful when the selection of the next beam and users on that beam (or their metrics/scheduling weights) is dependent on the outcome of the allocations of the first beam as it ensures the same user is not considered on overlapping beams. According to another example embodiment, the CPU core may dispatch the next task without waiting for the first one to finish, and move on to other operations, returning to process the output of the scheduler accelerator when a suitable notification is received that the scheduler accelerator has completed the task. Please note, for the sake of clarity, that the terms "task" and "job" are interchangeable as used herein.

According to another example embodiment, multiple CPU cores may be used that feed into the same scheduler accelerator in parallel. For example, two different CPU cores may process two different cells and simultaneously issue resource allocation requests to the accelerator for their respective cells. In some examples, two different cores may even process two transmission layers in the same cell and simultaneously issue resource allocation requests to the accelerator for their respective layers. In this case, when a task is completed by the accelerator, it is necessary that the notification of the completion is sent back to a particular originator. To help the EM to route the response back to the correct requesting core, the CPU core can include a core ID and an EM queue ID along with the event sent to the accelerator, such as shown in message 416 in FIG. 4. When the scheduler accelerator completes the job, the scheduler accelerator enqueues the completion notification event into the correct EM queue and optionally includes the requesting core ID in the event. The EM can dispatch the response back to the correct core that requested that event.

According to an example embodiment, a scheduler accelerator is configured to process multiple jobs/events simultaneously, such as when multiple CPU cores are utilized and multiple jobs are sent to the accelerator simultaneously from the multiple CPU cores. For example, the scheduler accelerator may be configured to have parallel circuitry to execute multiple tasks simultaneously. In such embodiments, the scheduler accelerator may read multiple jobs in one batch from the EM.

Figure 5:
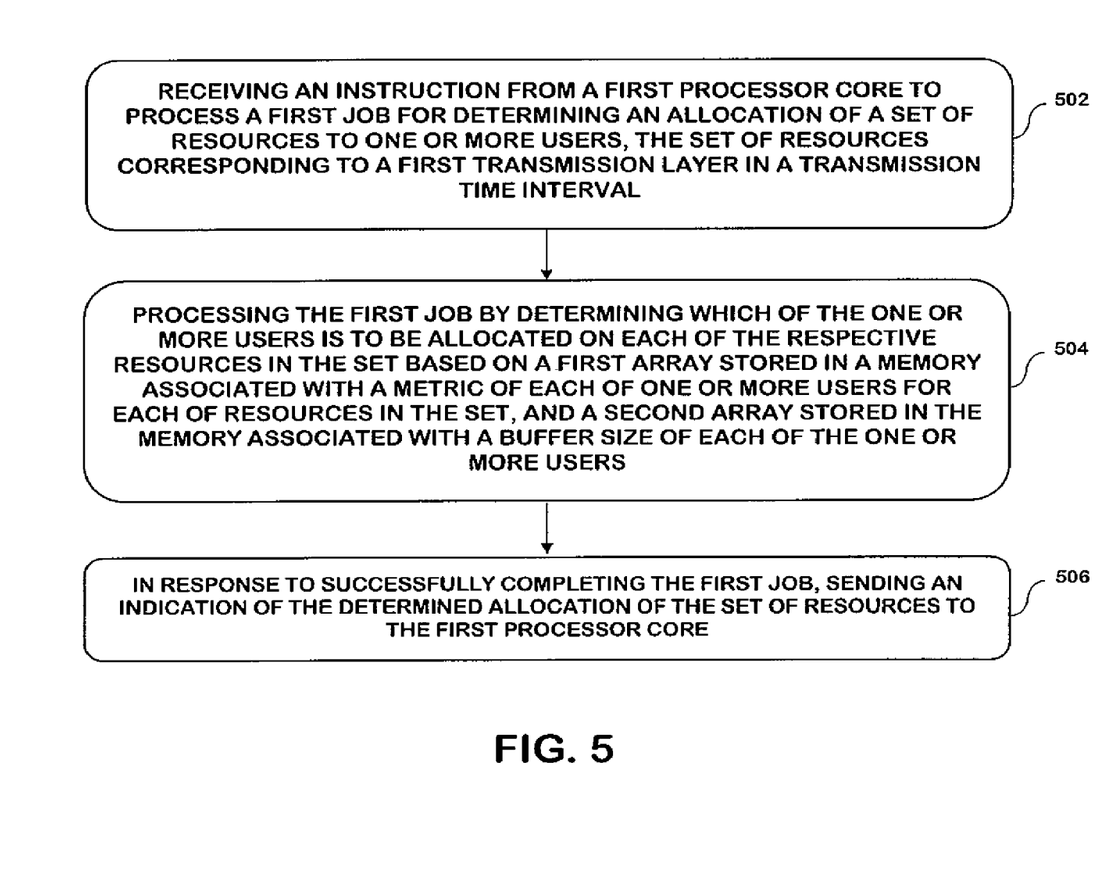
FIG. 5 is a logic flow diagram for hardware acceleration for a frequency domain scheduler, and illustrates the operation of an exemplary method or methods, a result of execution of computer program instructions embodied on a computer readable memory, functions performed by logic implemented in hardware, and/or interconnected means for performing functions in accordance with exemplary embodiments.

FIG. 5 is a logic flow diagram for hardware acceleration for frequency domain scheduler. This figure further illustrates the operation of an exemplary method or methods, a result of execution of computer program instructions embodied on a computer readable memory, functions performed by logic implemented in hardware, and/or interconnected means for performing functions in accordance with exemplary embodiments. For instance, the accelerator module 150-1 and/or 150-2 (see FIG. 1) may include multiples ones of the blocks in FIG. 5, where each included block is an interconnected means for performing the function in the block. The blocks in FIG. 5 are assumed to be performed by a base station such as gNB 170, e.g., under control of the accelerator module 150-1 and/or 150-2 at least in part.

Referring to FIG. 5, a method is provided including: receiving an instruction from a first processor core to process a first job for determining an allocation of a set of resources to one or more users, the set of resources corresponding to a first transmission layer in a transmission time interval as indicated by block 502; processing the first job by determining which of the one or more users is to be allocated on each of the respective resources in the set based on a first array stored in a memory associated with a metric of each of one or more users for each of the resources in the set, and a second array stored in the memory associated with a buffer size of each of the one or more users as indicated by block 504; and in response to successfully completing the first job, sending an indication of the determined allocation of the set of resources to the first processor core as indicated by block 506.

The instruction may include a group of pointers to locations in the memory of the first array and the second array. Determining the allocation of the set of resources may be based on a third array corresponding to a scheduling weight of each of the one or more users, wherein the instruction comprises an indication of a location in the memory of the third array. The instruction may include a pointer to a location in the memory of a fourth array, and the determined resource allocation may be written in the memory at the fourth array. Determining the allocation of the set of resources may be based on a fifth array corresponding to a number of control channel elements assigned to each of the one or more users, and the instruction may include an indication of a location in the memory of the fifth array. A length of the first array may represent a number of resources in the set of resources, and a length of the second array may be equal to a number of the one or more users. The first array may be an array of pointer values to one or more further arrays stored in the memory, where each of the further arrays may correspond to a respective one of the resources in the set of resources, and each element in each of the further arrays may correspond to a value of the metric for a user on each respective resource in the set. The metric may be a spectral efficiency metric. The method may further include: in response to detecting at least one error related to the first job, sending an indication of the at least one error to the first processor core. The method may further include receiving at least one second instruction to process a second job for determining an allocation of a set of resources corresponding to another transmission layer in the transmission time interval for the one or more users. The second job may be received prior to completing the first job. The second job may be received in response to completing the first job. The second job may be received from a different processor core than the first processor core. The instruction for the first job may be received via an event machine. The first job may be associated with an identification value indicating that the first processor core corresponds to the first job and a queue position value identifying a position of the first job in a queue of an event machine. The first job may be processed by either a hardware accelerator or a co-processor. The method may include transmitting data via the first transmission layer based on the determined resource allocation. Each resource in the set of resources may include a frequency domain resource.

An additional example of an embodiment includes a computer program, which when the computer program is run on a processor causes the performance of a method including: receiving an instruction from a first processor core to process a first job for determining an allocation of a set of resources to one or more users, the set of resources corresponding to a first transmission layer in a transmission time interval; processing the first job by determining which of the one or more users is to be allocated on each of the respective resources in the set based on a first array stored in a memory associated with a metric of each of one or more users for each of the resources in the set, and a second array stored in the memory associated with a buffer size of each of the one or more users; and in response to successfully completing the first job, sending an indication of the determined allocation of the set of resources to the first processor core. The computer program may be a computer program product comprising a computer-readable medium bearing computer program code embodied therein for use with a computer.

According to another example embodiment, an apparatus is provided including: means for receiving an instruction from a first processor core to process a first job for determining an allocation of a set of resources to one or more users, the set of resources corresponding to a first transmission layer in a transmission time interval; means for processing the first job by determining which of the one or more users is to be allocated on each of the respective resources in the set based on a first array stored in a memory associated with a metric of each of one or more users for each of the resources in the set, and a second array stored in the memory associated with a buffer size of each of the one or more users; and in response to successful completion of the first job, means for sending an indication of the determined allocation of the set of resources to the first processor core.

According to another example embodiment, an apparatus is provided including: a hardware accelerator; at least one processor comprising one or more processing cores; at least one non-transitory memory including computer program code, the at least one memory and the computer program code configured to, with the at least one processor and the hardware accelerator, cause the apparatus at least to: receive an instruction at the hardware accelerator from a first processor core of the at least one processor to process a first job for determining an allocation of a set of resources to one or more users, the set of resources corresponding to a first transmission layer in a transmission time interval; process, by the hardware accelerator, the first job by determining which of the one or more users is to be allocated on each of the respective resources in the set based on a first array stored in a memory associated with a metric of each of one or more users for each of the resources in the set, and a second array stored in the memory associated with a buffer size of each of the one or more users; and in response to successfully completion of the first job, send an indication of the determined allocation of the set of resources to the first processor core.

The instruction may include: a group of pointers to locations in the at least one memory of the first array and the second array. Determination of the allocation of the set of resources may be based on a third array corresponding to a scheduling weight of each of the one or more users, and the instruction may include an indication of a location in the memory of the third array. The instruction may include a pointer to a location in the memory of a fourth array, wherein the determined resource allocation is written in the memory at the fourth array. Determination of the allocation of the set of resources may be based on a fifth array corresponding to a number of control channel elements assigned to each of the one or more users, and the instruction may include an indication of a location in the memory of the fifth array. A length of the first array may represent a number of resources in the set of resources, and a length of the second array may be equal to a number of the one or more users. The first array may be an array of pointer values to one or more further arrays stored in the memory, wherein each of the further arrays corresponds to a respective one of the resources in the set of resources, and each element in each of the further arrays corresponds to a value of the metric for a user on each respective resource in the set. The metric may be a spectral efficiency metric. In response to detection of at least one error related to the first job, the at least one memory and the computer program code may be configured to, with the at least one processor and the hardware accelerator, cause the apparatus at least to send an indication of the at least one error to the first processor core. The at least one memory and the computer program code may be configured to, with the at least one processor and the hardware accelerator, cause the apparatus at least to receive at least one second instruction to process a second job for determining an allocation of a set of resources corresponding to another transmission layer in the transmission time interval for the one or more users. The second job may be received prior to completing the first job. The second job may be received in response to completing the first job. The second job may be received from a different processor core than the first processor core. The instruction for the first job is received via an event machine. The first job may be associated with an identification value indicating that the first processor core corresponds to the first job and a queue position value identifying a position of the first job in a queue of an event machine. The hardware accelerator may be a separate piece of hardware or a co-processor. The at least one memory and the computer program code may be configured to, with the at least one processor and the hardware accelerator, cause the apparatus at least to transmit data via the first transmission layer based on the determined resource allocation. Each resource in the set of resources may include a frequency domain resource.

Without in any way limiting the scope, interpretation, or application of the claims appearing below, a technical effect of one or more of the example embodiments disclosed herein is decreasing the execution time for the MAC scheduler by offloading compute-heavy tasks from one or more CPU cores to dedicated hardware. Another technical effect of one or more of the example embodiments disclosed herein is reducing energy and costs down by using lower-power-consumption cores as some of the work that is associated with the Scheduler is executed by dedicated hardware. Example embodiments are beneficial for 5G where the amount of work for the Scheduler expands due to massive MIMO, and the time to execute shrinks due to the smaller TTI durations.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:
- eNB (or eNodeB) evolved Node B (e.g., an LTE base station)
- gNB 5$^{th}$ generation Node B
- FD Frequency Domain
- HW Hardware
- I/F interface
- LTE long term evolution
- MME mobility management entity
- NCE network control element
- N/W network
- RRH remote radio head
- Rx receiver
- SD Spatial domain
- SGW serving gateway
- SOC System on Chip
- TD Time Domain
- Tx transmitter
- UE user equipment (e.g., a wireless, typically mobile device)

What is claimed is:

1. A method implemented with a radio access network node, comprising:
  receiving an instruction from a first processor core to process a first job for determining an allocation of a set of radio resources to one or more user devices, the set of radio resources corresponding to a first multiple input multiple output transmission layer of multiple input multiple output transmission layers in a transmission time interval;
  wherein a scheduler of the radio access network node has an amount of time given by the transmission time interval to execute the determining of the allocation of the set of radio resources corresponding to the first multiple input multiple output transmission layer of the multiple input multiple output transmission layers in the transmission time interval to the one or more user devices;
  processing the first job by determining which of the one or more user devices is to be allocated on each of the respective radio resources in the set of radio resources corresponding to the first multiple input multiple output transmission layer of the multiple input multiple output transmission layers based on a first array stored in at least one memory of the radio access network node associated with a metric of each of one or more user devices for each of the radio resources in the set of radio resources corresponding to the first multiple input multiple output transmission layer of the multiple input multiple output transmission layers, and a second array stored in the at least one memory of the radio access network node associated with a buffer size of each of the one or more user devices; and
  in response to successfully completing the first job, sending an indication of the determined allocation of the set of radio resources to the first processor core,
  wherein the instruction received from the first processor core to process the first job for determining the allocation of the set of radio resources corresponding to the first multiple input multiple output transmission layer of the multiple input multiple output transmission layers in the transmission time interval to the one or more user devices comprises: a pointer to a location in the at least one memory of the first array associated with the metric of each of the one or more user devices for each of the radio resources in the set of radio resources, and a pointer to a location in the at least one memory of the second array associated with the buffer size of each of the one or more user devices; and
  transmitting, using a transmitter of the radio access network node over a communication network, the determined allocation of the set of radio resources corresponding to the first multiple input multiple output transmission layer of the multiple input multiple output transmission layers in the transmission time interval to the one or more user devices.

2. The method as in claim 1, wherein determining the allocation of the set of radio resources is further based on a third array corresponding to a scheduling weight of each of the one or more user devices, wherein the instruction comprises an indication of a location in the at least one memory of the third array.

3. The method as in claim 1, wherein the instruction comprises a pointer to a location in the at least one memory of a fourth array, wherein the determined resource allocation is written in the at least one memory at the fourth array.

4. The method as in claim 1, wherein determining the allocation of the set of radio resources is further based on a fifth array corresponding to a number of control channel elements assigned to each of the one or more user devices, wherein the instruction comprises an indication of a location in the at least one memory of the fifth array.

5. The method as in claim 1, wherein the first array comprises an array of pointer values that point to one or more further arrays stored in the at least one memory, wherein each of the further arrays corresponds to a respective one of the radio resources in the set of radio resources, and each element in each of the further arrays corresponds to a value of the metric for a user on each respective radio resource in the set of radio resources.

6. The method of claim 5, wherein the location in the memory of the first array associated with the metric of each of the one or more user devices for each of the radio resources in the set of radio resources comprises a pointer value of the array of pointer values to the one or more further arrays stored in the memory.

7. The method as in claim 1, wherein the metric comprises a spectral efficiency metric.

8. The method as in claim 1, further comprising:
  receiving at least one second instruction to process a second job for determining an allocation of a set of radio resources corresponding to another multiple input multiple output transmission layer of the multiple input multiple output transmission layers in the transmission time interval for the one or more user devices.

9. The method as in claim 1, further comprising transmitting data via the first multiple input multiple output transmission layer based on the determined resource allocation.

10. The method of claim 1, wherein:
  the instruction received from the first processor core comprises: an identifier of the first processor core, or an identifier of a queue from which the first job for determining the allocation of the set of radio resources to the one or more user devices is retrieved;
  the indication of the determined allocation of the set of radio resources sent to the first processor core: comprises the identifier of the first processor core, or is enqueued into the queue identified with the identifier of the queue; and
  the identifier of the first processor core or the identifier of the queue is configured to be used to route the indication of the determined allocation of the set of radio resources to a correct processor core comprising the first processor core, wherein another instruction is received from a second processor core to process a second job for determining an allocation of a set of radio resources to one or more user devices.

11. The method of claim 1, wherein the radio resources allocated to the one or more user devices comprise frequency domain resources.

12. The method of claim 1, wherein the set of radio resources allocated to the one or more user devices comprises at least one beam of the first multiple input multiple output transmission layer of the multiple input multiple input transmission layers for the one or more user devices to use for transmission or reception.

13. A radio access network node, comprising:
at least one processor; and
at least one memory storing instructions that, when executed by the at least one processor, cause the radio access network node to at least:
receive an instruction from a first processor core to process a first job for determining an allocation of a set of radio resources to one or more user devices, the set of radio resources corresponding to a first multiple input multiple output transmission layer of multiple input multiple output transmission layers in a transmission time interval;
wherein a scheduler of the radio access network node has an amount of time given by the transmission time interval to execute the determining of the allocation of the set of radio resources corresponding to the first multiple input multiple output transmission layer of the multiple input multiple output transmission layers in the transmission time interval to the one or more user devices;
process the first job by determining which of the one or more user devices is to be allocated on each of the respective radio resources in the set of radio resources corresponding to the first multiple input multiple output transmission layer of the multiple input multiple output transmission layers based on a first array stored in the at least one memory of the radio access network node associated with a metric of each of one or more user devices for each of the radio resources in the set of radio resources corresponding to the first multiple input multiple output transmission layer of the multiple input multiple output transmission layers, and a second array stored in the at least one memory of the radio access network node associated with a buffer size of each of the one or more user devices; and
send, in response to successfully completing the first job, an indication of the determined allocation of the set of radio resources to the first processor core,
wherein the instruction received from the first processor core to process the first job for determining the allocation of the set of radio resources corresponding to the first multiple input multiple output transmission layer of the multiple input multiple output transmission layers in the transmission time interval to the one or more user devices comprises: a pointer to a location in the at least one memory of the first array associated with the metric of each of the one or more user devices for each of the radio resources in the set of radio resources, and a pointer to a location in the at least one memory of the second array associated with the buffer size of each of the one or more user devices; and transmit, using a transmitter of the radio access network node over a communication network, the determined allocation of the set of radio resources corresponding to the first multiple input multiple output transmission layer of the multiple input multiple output transmission layers in the transmission time interval to the one or more user devices.

14. The radio access network node as in claim 13, where the determination of the allocation of the set of radio resources is based on a third array corresponding to a scheduling weight of each of the one or more user devices, wherein the instruction comprises an indication of a location in the at least one memory of the third array.

15. The radio access network node as in claim 13, wherein the instruction comprises a pointer to a location in the at least one memory of a fourth array, wherein the determined resource allocation is written in the at least one memory at the fourth array.

16. The radio access network node as in claim 13, wherein determination of the allocation of the set of radio resources is further based on a fifth array corresponding to a number of control channel elements assigned to each of the one or more user devices, wherein the instruction comprises an indication of a location in the at least one memory of the fifth array.

17. The radio access network node as in claim 13, wherein the first array comprises an array of pointer values that point to one or more further arrays stored in the at least one memory, wherein each of the further arrays corresponds to a respective one of the radio resources in the set of radio resources, and each element in each of the further arrays corresponds to a value of the metric for a user on each respective radio resource in the set of radio resources.

18. The radio access network node as in claim 13, wherein the at least one memory stores instructions that, when executed by the at least one processor, cause the radio access network node at least to:
send, in response to detecting at least one error related to the first job, an indication of the at least one error to the first processor core.

19. The radio access network node as in claim 13, wherein the at least one memory stores instructions that, when executed by the at least one processor, cause the radio access network node to at least:
receive at least one second instruction to process a second job for determining an allocation of a set of radio resources corresponding to another multiple input multiple output transmission layer of the multiple input multiple output transmission layers in the transmission time interval for the one or more user devices.

20. The radio access network node as in claim 13, wherein the at least one memory stores instructions that, when executed by the at least one processor, cause the radio access network node to at least:
transmit data via the first multiple input multiple output transmission layer based on the determined resource allocation.

21. A base station comprising the radio access network node according claim 13.

22. A radio access network node, comprising:
a hardware accelerator;
at least one processor comprising one or more processing cores;
at least one memory including computer program code, where the at least one memory and the computer program code are configured to, with the at least one processor and the hardware accelerator, cause the apparatus at least to:

receive an instruction at the hardware accelerator from a first processor core of the at least one processor to process a first job for determining an allocation of a set of radio resources to one or more user devices, the set of radio resources corresponding to a first multiple input multiple output transmission layer of multiple input multiple output transmission layers in a transmission time interval;

wherein a scheduler of the radio access network node has an amount of time given by the transmission time interval to execute the determining of the allocation of the set of radio resources corresponding to the first multiple input multiple output transmission layer of the multiple input multiple output transmission layers in the transmission time interval to the one or more user devices;

process, by the hardware accelerator, the first job by determining which of the one or more user devices is to be allocated on each of the respective radio resources in the set of radio resources corresponding to the first multiple input multiple output transmission layer of the multiple input multiple output transmission layers based on a first array stored in the at least one memory associated with a metric of each of one or more users for each of the radio resources in the set of radio resources corresponding to the first multiple input multiple output transmission layer of the multiple input multiple output transmission layers, and a second array stored in the at least one memory associated with a buffer size of each of the one or more user devices; and in response to successful completion of the first job, send an indication of the determined allocation of the set of radio resources to the first processor core, wherein the instruction received at the hardware accelerator from the first processor core to process the first job for determining the allocation of the set of radio resources corresponding to the first multiple input multiple output transmission layer of the multiple input multiple output transmission layers in the transmission time interval to the one or more user devices comprises: a pointer to a location in the at least one memory of the first array associated with the metric of each of the one or more user devices for each of the radio resources in the set of radio resources, and a pointer to a location in the at least one memory of the second array associated with the buffer size of each of the one or more user devices; and transmit, using a transmitter of the radio access network node over a communication network, the determined allocation of the set of radio resources corresponding to the first multiple input multiple output transmission layer of the multiple input multiple output transmission layers in the transmission time interval to the one or more user devices.

23. A computer program comprising program code, encoded on a non-transitory computer readable medium, configured to cause execution of the method according to claim 1.

\* \* \* \* \*